US012739503B2

(12) United States Patent
Wu

(10) Patent No.: US 12,739,503 B2
(45) Date of Patent: Sep. 15, 2026

(54) PORTABLE ELECTRONIC DEVICE AND TRANSMISSION CONTROL METHOD THEREOF

(71) Applicant: Getac Technology Corporation, New Taipei City (TW)

(72) Inventor: Ming-Zong Wu, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 98 days.

(21) Appl. No.: 19/016,193

(22) Filed: Jan. 10, 2025

(65) Prior Publication Data

US 2026/0113534 A1 Apr. 23, 2026

(30) Foreign Application Priority Data

Oct. 21, 2024 (CN) ......................... 202411467674.2

(51) Int. Cl.
*H04N 23/661* (2023.01)
*H04N 23/65* (2023.01)
*H04N 23/90* (2023.01)

(52) U.S. Cl.
CPC ........... *H04N 23/661* (2023.01); *H04N 23/65* (2023.01); *H04N 23/90* (2023.01)

(58) Field of Classification Search
CPC ...... H04N 23/661; H04N 23/65; H04N 23/90; H04N 23/66; H04N 23/54; H04N 5/262;
(Continued)

(56) References Cited

U.S. PATENT DOCUMENTS 7,562,159 B2 7/2009 Chen et al.
2019/0141271 A1* 5/2019 Kang .................. H04N 23/667
(Continued)

FOREIGN PATENT DOCUMENTS

CN 106897239 A 6/2017
CN 111930647 B 12/2020
(Continued)

OTHER PUBLICATIONS

Innodisk Unveils Groundbreaking MIPI over Type-C Camera Solution with extended connection distance, https://www.innodisk.com/en/news/mipi-over-type-c-camera-solution, [dated retrieved: Dec. 19, 2025], 3 pages.
European Search Report issued on Sep. 25, 2025 for EP application No. 25170362.5, 11 pages.

*Primary Examiner* — Gevell V Selby
(74) *Attorney, Agent, or Firm* — Cooper Legal Group, LLC

(57) ABSTRACT

A portable electronic device and a transmission control method. The portable electronic device includes a transmission interface, a power management circuit that detects an external device connected to the transmission interface as a power supply or receiving device, a switching circuit, and a control circuit that controls the switching circuit by a detection result of the power management circuit. When a first transmission channel is selected for conduction with the transmission interface, the control circuit outputs a device identification signal via the first transmission channel to identify the external device. When the external device is identifiable, an image signal of the external device is received via the first transmission channel. When the external device is not identifiable, the switching circuit is controlled to select a second transmission channel for conduction with the transmission interface, and signal transmission with the external device is performed via the second transmission channel.

20 Claims, 9 Drawing Sheets

(58) Field of Classification Search
CPC ................ H04N 23/631; G06F 13/385; G06F 13/4022; G06F 13/4282
See application file for complete search history.

(56) References Cited

U.S. PATENT DOCUMENTS

| | | | | |
|---|---|---|---|---|
| 2020/0213007 | A1* | 7/2020 | Wang ................. | H04B 10/1141 |
| 2022/0318835 | A1* | 10/2022 | Kusens .............. | G06K 7/10366 |
| 2022/0353478 | A1 | 11/2022 | Alakarhu et al. | |
| 2024/0098354 | A1 | 3/2024 | Zhang | |

FOREIGN PATENT DOCUMENTS

| | | | |
|---|---|---|---|
| CN | 112306929 | A | 2/2021 |
| CN | 116069277 | A | 5/2023 |
| CN | 118741195 | A | 10/2024 |
| EP | 3657778 | A1 | 5/2020 |
| TW | I603201 | B | 10/2017 |
| TW | I631504 | B | 8/2018 |

* cited by examiner

PORTABLE ELECTRONIC DEVICE AND TRANSMISSION CONTROL METHOD THEREOF

CROSS-REFERENCE TO RELATED PATENT APPLICATION

This application claims the benefit of priority to China Patent Application No. 202411467674.2, filed on Oct. 21, 2024, in the People's Republic of China. The entire content of China Patent Application No. 202411467674.2 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to a portable electronic device and a transmission control method thereof.

BACKGROUND OF THE DISCLOSURE

An existing portable imaging device is conventionally worn on a person for conveniently capturing surrounding scenery. However, since a camera lens of the portable imaging device is fixedly disposed on a device body, a capturing angle of the camera lens is limited. In addition, due to limitations related to an assembly position of the lens, a direction of the capturing angle cannot be flexibly adjusted.

As such, for certain portable imaging devices, the camera lens is implemented by another method. By way of extending the camera lens outside of the device body through a transmission line, the capturing angle of the camera lens can be more flexibly adjusted. However, this method requires multiple ports on the device body and a long extension cord to satisfy diverse requirements during operation.

SUMMARY OF THE DISCLOSURE

The present disclosure provides a portable electronic device and a transmission control method thereof.

One of the technical aspects adopted by the present disclosure is to provide a portable electronic device, which includes a transmission interface, a power management circuit, a switching circuit, and a control circuit. The transmission interface is configured to connect to an external device. The power management circuit detects the external device as a power supply device or a power receiving device. The switching circuit provides a first transmission channel or a second transmission channel for connection to the transmission interface. The control circuit controls the switching circuit according to a detection result of the power management circuit. When the control circuit controls the switching circuit to select the first transmission channel for conduction with the transmission interface, the control circuit outputs a device identification signal via the first transmission channel, so as to identify the external device that is connected to the transmission interface. When the external device is identifiable by the device identification signal, the control circuit receives an image signal of the external device via the first transmission channel. When the external device is not identifiable by the device identification signal, the control circuit controls the switching circuit to select the second transmission channel for conduction with the transmission interface, and the control circuit performs signal transmission with the external device via the second transmission channel.

One of the technical aspects adopted by the present disclosure is to provide a transmission control method of a portable electronic device. The transmission control method includes: detecting whether an external device is a power supply device or a power receiving device when the external device is connected to a transmission interface of the portable electronic device; controlling, according to a detection result, a switching circuit of the portable electronic device to select a first transmission channel or a second transmission channel for conduction with the transmission interface; outputting, when the switching circuit selects the first transmission channel for conduction with the transmission interface, a device identification signal via the first transmission channel for identification of the external device that is connected to the transmission interface, and receiving an image signal of the external device via the first transmission channel when the external device is identifiable by the device identification signal; and controlling the switching circuit to select the second transmission channel for conduction with the transmission interface when the external device is not identifiable by the device identification signal, and performing signal transmission with the external device via the second transmission channel.

Therefore, in the portable electronic device and the transmission control method thereof provided by the present disclosure, the portable electronic device can confirm the type of the external device through multiple verification processes, thereby correspondingly and selectively using a transmission channel that is compatible with the external device for data transmission. In this way, with one single transmission interface, different functional applications of the portable electronic device can be effectively expanded.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
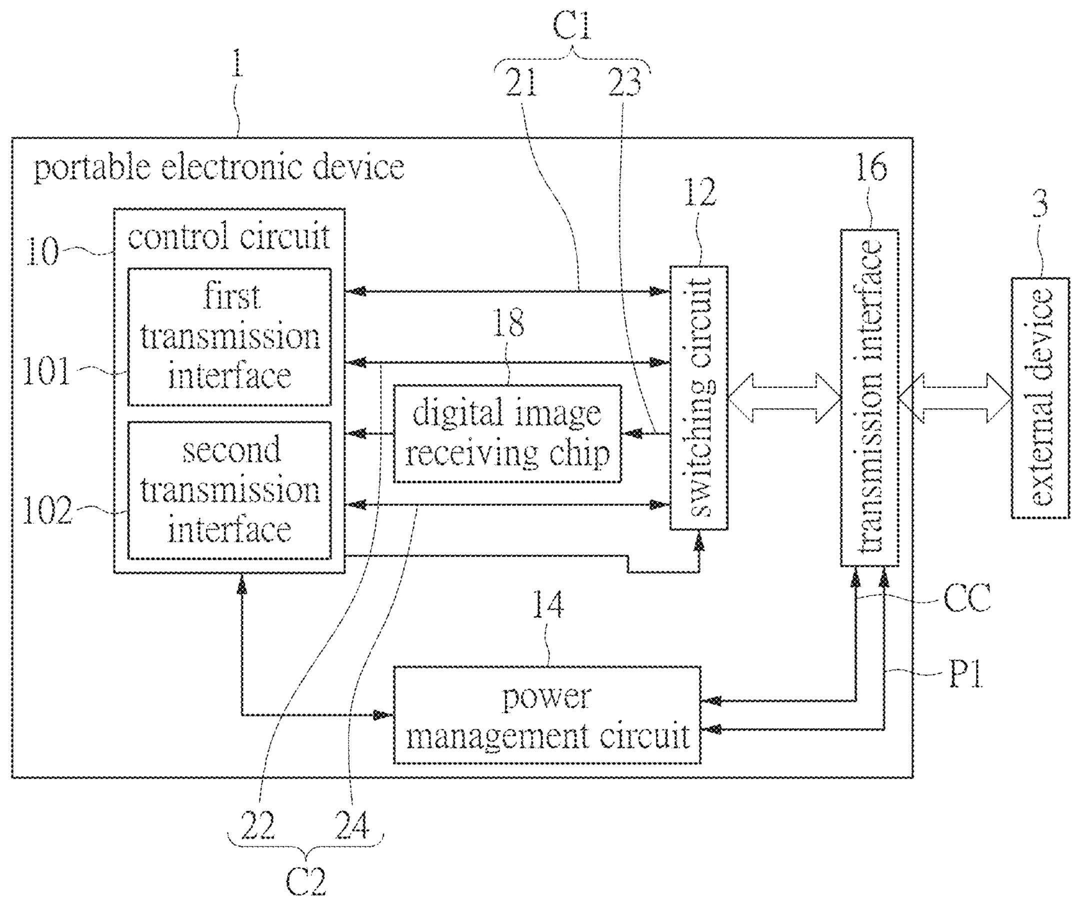
FIG. 1 is a schematic diagram of a framework of a portable electronic device and an external device according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated upon or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

One embodiment of the present disclosure provides a portable electronic device and a transmission control method thereof. Through one single transmission interface, the portable electronic device mentioned herein allows insertion of multiple external devices having different functions. The portable electronic device can automatically identify the type of the external device, and selectively use a transmission channel that is compatible with the external device. Accordingly, the quantity of the transmission interface used in the portable electronic device can be effectively reduced, and different functional applications of the portable electronic device can be effectively expanded via one single transmission interface.

Embodiment of Operational Framework of the Portable Electronic Device

Reference is made to FIG. 1, which is a schematic diagram of a framework of a portable electronic device and an external device according to one embodiment of the present disclosure. A portable electronic device 1 of the present embodiment has a transmission interface 16, and the transmission interface 16 is provided for insertion between an external device 3 and the portable electronic device 1. When the portable electronic device 1 is inserted with different types of the external device 3, different functional applications of the portable electronic device 1 can be expanded. Specifically, the portable electronic device 1 includes, for example but not limited to, a control circuit 10, a switching circuit 12, and a power management circuit 14. The control circuit 10 is connected to the switching circuit 12 and the power management circuit 14, and the transmission interface 16 is connected to the switching circuit 12 and the power management circuit 14.

A plurality of transmission channels are present between the control circuit 10 and the switching circuit 12, and the control circuit 10 controls the switching circuit 12 to select one of the transmission channels for connection to the transmission interface 16. Taking a framework of FIG. 1 for example, a first transmission channel C1 and a second transmission channel C2 are present between the control circuit 10 and the switching circuit 12. When the switching circuit 12 selects the first transmission channel C1 for connection to the transmission interface 16, a first transmission interface 101 of the control circuit 10 performs data transmission in the first transmission channel C1 according to a first transmission protocol. When the switching circuit 12 selects the second transmission channel C2 for connection to the transmission interface 16, a second transmission interface 102 of the control circuit 10 performs data transmission in the second transmission channel C2 according to a second transmission protocol.

In one embodiment, the control circuit 10 further controls the switching circuit 12 according to a detection result of the power management circuit 14. When the power management circuit 14 is connected to the external device 3 at the transmission interface 16 (i.e., the external device 3 is inserted with the portable electronic device 1), the power management circuit 14 can detect the type of the external device 3 via the transmission interface 16. For example, the external device 3 can be a power supply device or a power receiving device. When the external device 3 is the power supply device, the power management circuit 14 can obtain power supplied by the power supply device via the transmission interface 16. That is, at this time, the portable electronic device 1 charges an internal rechargeable battery based on the power supplied by the power supply device. Such a rechargeable battery can be integrated into the power management circuit 14, or can be separately disposed outside of the power management circuit 14. When the external device 3 is the power receiving device, the power management circuit 14 can supply power to the power receiving device via the transmission interface 16.

In one embodiment, when the control circuit 10 controls the switching circuit 12 to select the first transmission channel C1 for conduction with transmission interface 16, the control circuit 10 outputs a device identification signal via the first transmission channel C1, so as to identify the external device 3 that is connected to the transmission interface 16. When the external device 3 is identifiable by the device identification signal, the control circuit 10 can receive an external signal of the external device 3 via the first transmission channel C1. For example, when the external device 3 is an imaging device, said external signal is an image signal. On the other hand, when the external device 3 is not identifiable by the device identification signal, the control circuit 10 controls the switching circuit 12 to select the second transmission channel C2 for conduction with the transmission interface 16, and the control circuit 10 performs signal transmission with the external device 3 via the second transmission channel C2.

For example, when the power management circuit 14 detects the external device 3 as the power receiving device, the control circuit 10 controls the switching circuit 12 to select the first transmission channel C1. The control circuit 10 outputs the device identification signal via the first transmission channel C1, so as to determine whether or not the power receiving device is identifiable by the portable electronic device 1. When the power receiving device is identifiable by the portable electronic device 1, a transmission signal between the portable electronic device 1 and the power receiving device is transmitted in a manner that meets the first transmission protocol. On the other hand, when the power receiving device is not identifiable by the portable electronic device 1 (i.e., the transmission signal between the portable electronic device 1 and the power receiving device is not transmitted in a manner that meets the first transmission protocol), and the external device 3 is likely to be the power supply device (rather than the power receiving device). At this time, the control circuit 10 re-controls the switching circuit 12 to select the second transmission channel C2. Afterwards, a transmission signal between the portable electronic device 1 and the power supply device is transmitted in a manner that meets the second transmission protocol.

In one embodiment, when the power management circuit 14 detects the external device 3 as the power supply device, the control circuit 10 controls the switching circuit 12 to select the second transmission channel C2. Afterwards, the transmission signal between the portable electronic device 1 and the power supply device is transmitted in a manner that meets the second transmission protocol.

In other embodiments, when the power management circuit 14 detects that the external device 3 is inserted with the transmission interface 16, the control circuit 10 controls the switching circuit 12 to preferably select the first transmission channel C1 regardless of whether the external device 3 is the power receiving device or the power supply device. Through the above-mentioned device identification signal, whether or not the external device 3 is identifiable can be determined. If the external device 3 is identifiable, the switching circuit 12 maintains its selection of the first transmission channel C1. Conversely, if the external device 3 is not identifiable, the control circuit 10 controls the switching circuit 12 to select the second transmission channel C2.

It can be observed from the descriptions above that the control circuit 10 can verify the type of the external device 3 through various means, and the control circuit 10 can perform data transmission with the external device 3 by selecting a compatible transmission protocol. As such, through one single transmission interface 16, the portable electronic device 1 can be widely adapted to various types of the external device 3 with different transmission protocols.

It should be noted that, the first transmission channel C1 includes, for example but not limited to, a first transmission path 21 and a third transmission path 23. The first transmission path 21 is configured to transmit the device identification signal, and the third transmission path 23 is configured to transmit the external signal provided by the external device 3. The second transmission channel C2 includes, for example but not limited to, a second transmission path 22 and a fourth transmission path 24. The second transmission path 22 is configured to transmit a first signal, and the fourth transmission path 24 is configured to transmit a second signal.

In one embodiment, when the external device 3 is the imaging device that is compatible with the first transmission protocol, the external signal of the external device 3 is the image signal. For example, when an imaging lens inside the imaging device is an MIPI (mobile industry processor interface) imaging lens, an image signal output by the MIPI imaging lens is processed by a digital image transmitting chip before being output. The digital image transmitting chip can be, for example, a serializer that performs parallel-to-serial image processing. Furthermore, a digital image receiving chip 18 is correspondingly disposed inside the portable electronic device 1 to process the image signal output by the imaging device. The digital image receiving chip 18 can be, for example, a deserializer that performs serial-to-parallel image processing, thereby converting the image signal output by the imaging device into an image signal that meets MIPI specifications. The digital image receiving chip 18 can be, for example, disposed between the third transmission path 23 and the control circuit 10.

In one embodiment, when the external device 3 is a device that is compatible with the second transmission protocol, the external device 3 can be, for example, a universal serial bus (USB) device, a USB host, or a USB power bank. Here, the USB host can be, for example, a computer host or a USB dock.

In one embodiment, the transmission interface 16 is a connector that meets USB specifications. The first signal used in the second transmission path 22 is compatible with USB 2.0, and the second signal used in the fourth transmission path 24 is compatible with USB 3.2.

In one embodiment, the power management circuit 14 has a communication pin CC and a power transmission busbar P1. The communication pin CC can communicate with the external device 3 via the transmission interface 16, so as to identify the type of the external device 3. According to a communication result of the communication pin CC, a power transmission direction of the power transmission busbar P1 can be controlled. For example, the power transmission busbar P1 can obtain a power supply of the external device 3 via the transmission interface 16, or the power transmission busbar P1 can provide a power supply to the external device 3 via the transmission interface 16.

Embodiment of Circuit of the Portable Electronic Device

Figure 2:
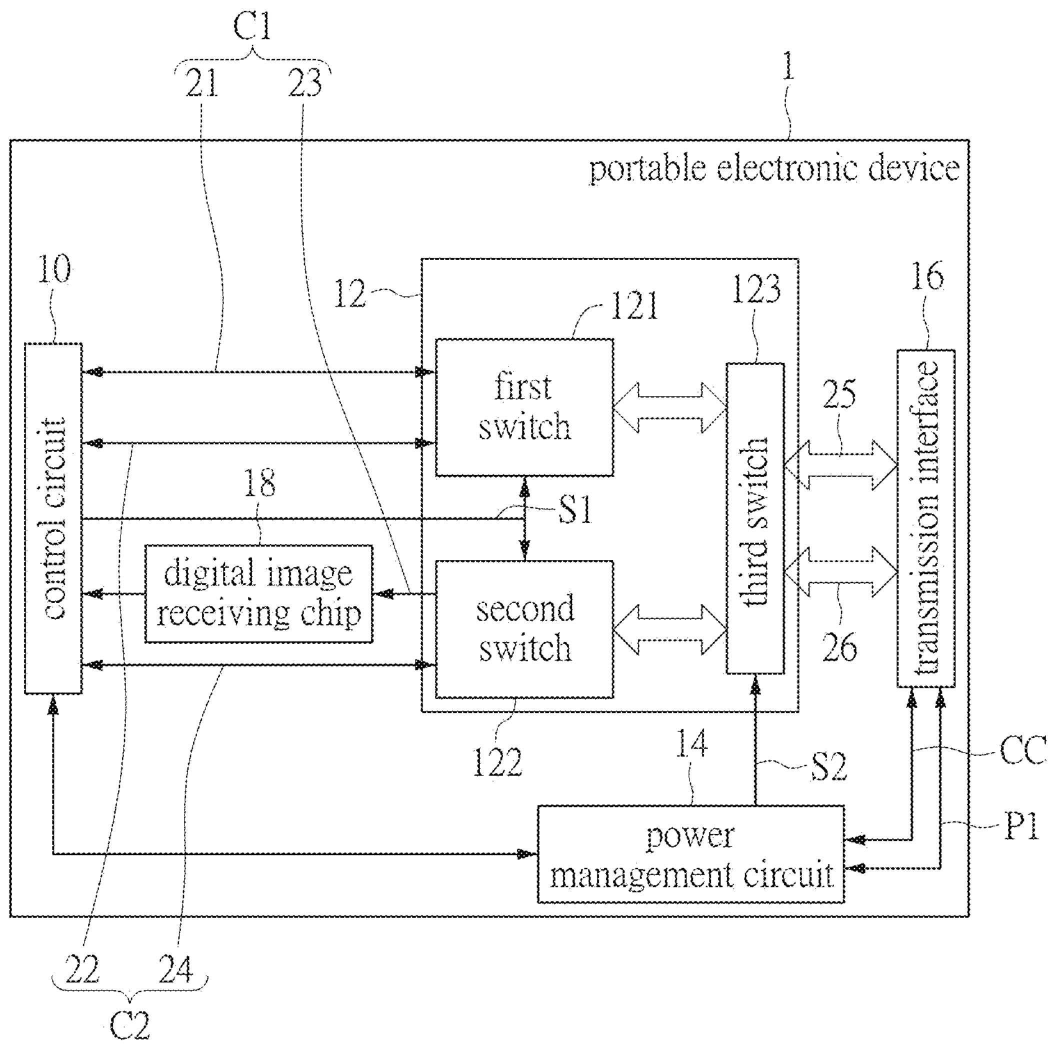
FIG. 2 is a circuit block diagram of the portable electronic device according to one embodiment of the present disclosure.

Reference is made to FIG. 2, which is a circuit block diagram of the portable electronic device according to one embodiment of the present disclosure. As shown in the portable electronic device 1 of FIG. 2, possible operations of the switching circuit 12 will be described based on the framework of FIG. 1. The switching circuit 12 includes, for example but not limited to, a first switch 121, a second switch 122, and a third switch 123. The first switch 121 provides the first transmission path 21 and the second transmission path 22 for connection to the control circuit 10. The second switch 122 provides the third transmission path 23 and the fourth transmission path 24 for connection to the control circuit 10. The third switch 123 provides a fifth transmission path 25 and a sixth transmission path 26 for connection to the transmission interface 16.

Specifically, the third switch 123 is connected to the first switch 121 and the second switch 122. The first transmission path 21 or the second transmission path 22 is connected to the transmission interface 16 via the first switch 121 and the third switch 123, and the third transmission path 23 or the fourth transmission path 24 is connected to the transmission interface 16 via the second switch 122 and the third switch 123.

In one embodiment, the control circuit 10 outputs a first switching signal S1 to the first switch 121 and the second switch 122, such that the first switch 121 and the second switch 122 select the first transmission channel C1 or the second transmission channel C2 to perform signal transmission with the third switch 123 according to the first switching signal S1.

In one embodiment, a power controller of the power management circuit 14 detects a connection direction between a connector of the external device 3 and the transmission interface 16, and the power controller of the power management circuit 14 outputs a second switching signal S2 to the third switch 123 according to the detection result, such that the third switch 123 uses the second switching signal S2 to select the fifth transmission path 25 or the sixth transmission path 26 for conduction with the first transmission channel C1 or the second transmission channel C2. Here, the fifth transmission path 25 and the transmission interface 16 use a first contact surface of the connector for connection, the sixth transmission path 26 and the transmission interface 16 use a second contact surface of the connector for connection, and the first contact surface and the second contact surface are two opposite surfaces of the connector.

For example, if the first switching signal S1 selects the first transmission channel C1, and the second switching signal S2 selects the fifth transmission path 25, a signal transmission path between the control circuit 10 and the external device 3 can be described as follows: the first transmission channel C1, the switching circuit 12, the fifth transmission path 25, and the transmission interface 16. Alternatively, if the first switching signal S1 selects the second transmission channel C2, and the second switching signal S2 selects the sixth transmission path 26, the signal transmission path between the control circuit 10 and the external device 3 can be described as follows: the second transmission channel C2, the switching circuit 2, the sixth transmission path 26, and the transmission interface 16.

Figure 3:
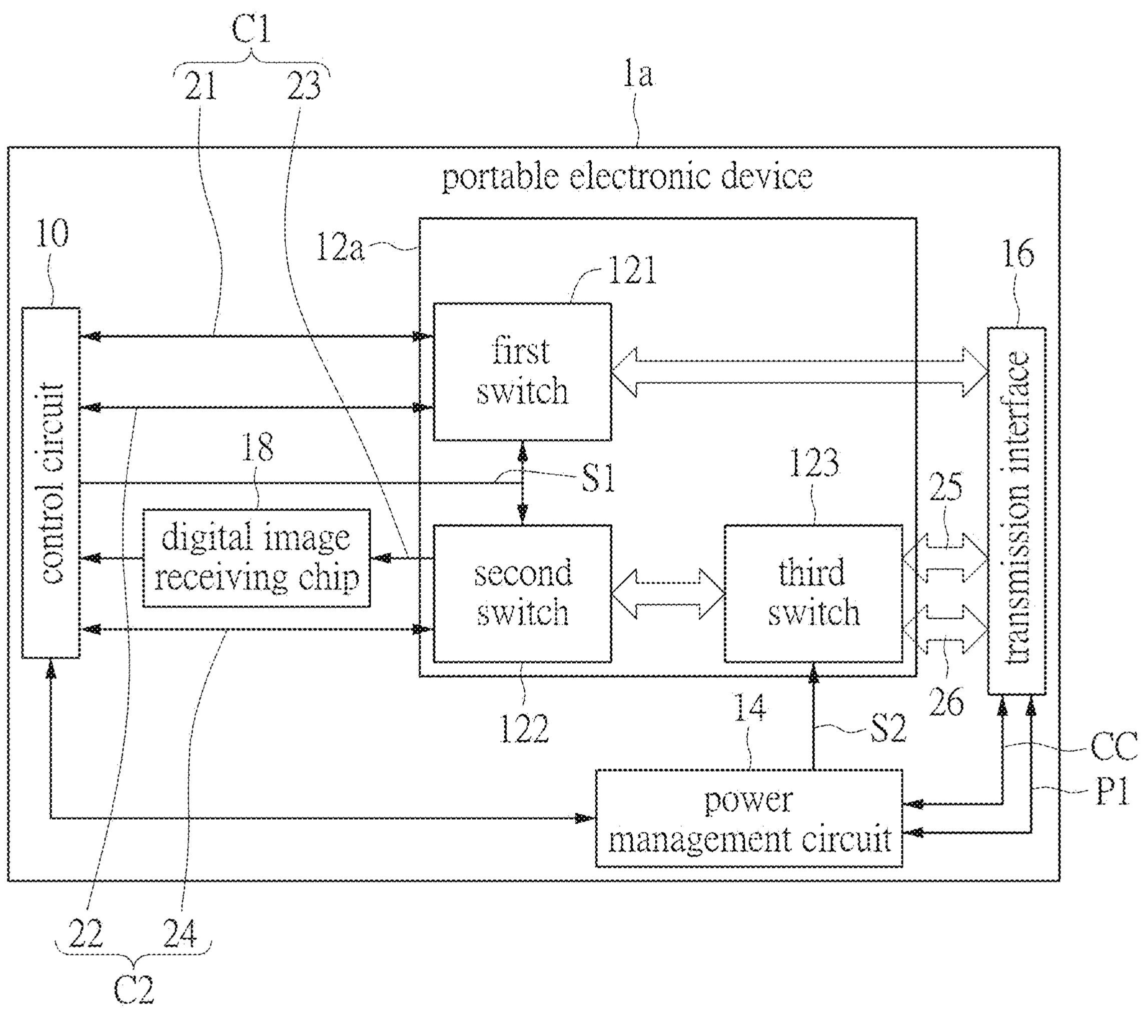
FIG. 3 is a circuit block diagram of the portable electronic device according to one embodiment of the present disclosure.

Reference is made to FIG. 3, which is a circuit block diagram of the portable electronic device according to one embodiment of the present disclosure. As shown in a portable electronic device 1*a* of FIG. 3, possible operations of a switching circuit 12*a* will be described based on the framework of FIG. 1. The switching circuit 12*a* includes, for example but not limited to, the first switch 121, the second switch 122, and the third switch 123. The first switch 121 provides the first transmission path 21 and the second transmission path 22 for connection to the control circuit 10. The second switch 122 provides the third transmission path 23 and the fourth transmission path 24 for connection to the control circuit 10. The third switch 123 provides the fifth transmission path 25 and the sixth transmission path 26 for connection to the transmission interface 16.

Specifically, the third switch 123 is connected to the second switch 122. The first transmission path 21 or the second transmission path 22 is connected to the transmission interface 16 via the first switch 121, and the third transmission path 23 or the fourth transmission path 24 is connected to the transmission interface 16 via the second switch 122 and the third switch 123.

In one embodiment, the power controller of the power management circuit 14 detects the connection direction between the connector of the external device 3 and the transmission interface 16, and the power controller of the power management circuit 14 outputs the second switching signal S2 to the third switch 123 according to the detection result, such that the third switch 123 uses the second switching signal S2 to select the fifth transmission path 25 or the sixth transmission path 26 for conduction with the first transmission channel C1 or the second transmission channel C2. Here, the fifth transmission path 25 and the transmission interface 16 use the first contact surface of the connector for connection, the sixth transmission path 26 and the transmission interface 16 use the second contact surface of the connector for connection, and the first contact surface and the second contact surface are two opposite surfaces of the connector. It should be noted that the first transmission path 21 or the second transmission path 22 is output to the transmission interface 16 via the first switch 121. That is, the first transmission path 21 or the second transmission path 22 is compatible with the transmission interface 16 when the first contact surface or the second contact surface of the connector is used.

For example, if the first switching signal S1 selects the first transmission channel C1, and the second switching signal S2 selects the fifth transmission path 25, the signal transmission path between the control circuit 10 and the external device 3 can be described as follows. Signal transmission between the control circuit 10 and the external device 3 is carried out via the first transmission path 21, the first switch 121, and the transmission interface 16, and is carried out via the third transmission path 23, the second switch 122, the third switch 123, the fifth transmission path 25, and the transmission interface 16. If the first switching signal S1 selects the second transmission channel C2, and the second switching signal S2 selects the sixth transmission path 26, the signal transmission path between the control circuit 10 and the external device 3 can be described as follows. Signal transmission between the control circuit 10 and the external device 3 is carried out via the second transmission path 22, the first switch 121, and the transmission interface 16, and is carried out via the fourth transmission path 24, the second switch 122, the third switch 123, the sixth transmission path 26, and the transmission interface 16.

In the embodiments shown in FIG. 2 and FIG. 3, since the transmission interface 16 is a connector that meets USB Type-C specifications, the connector of the external device 3 is allowed to use a top side or a bottom side for insertion with the transmission interface 16.

Embodiment of Transmission Control Method of the Portable Electronic Device

Figure 4:
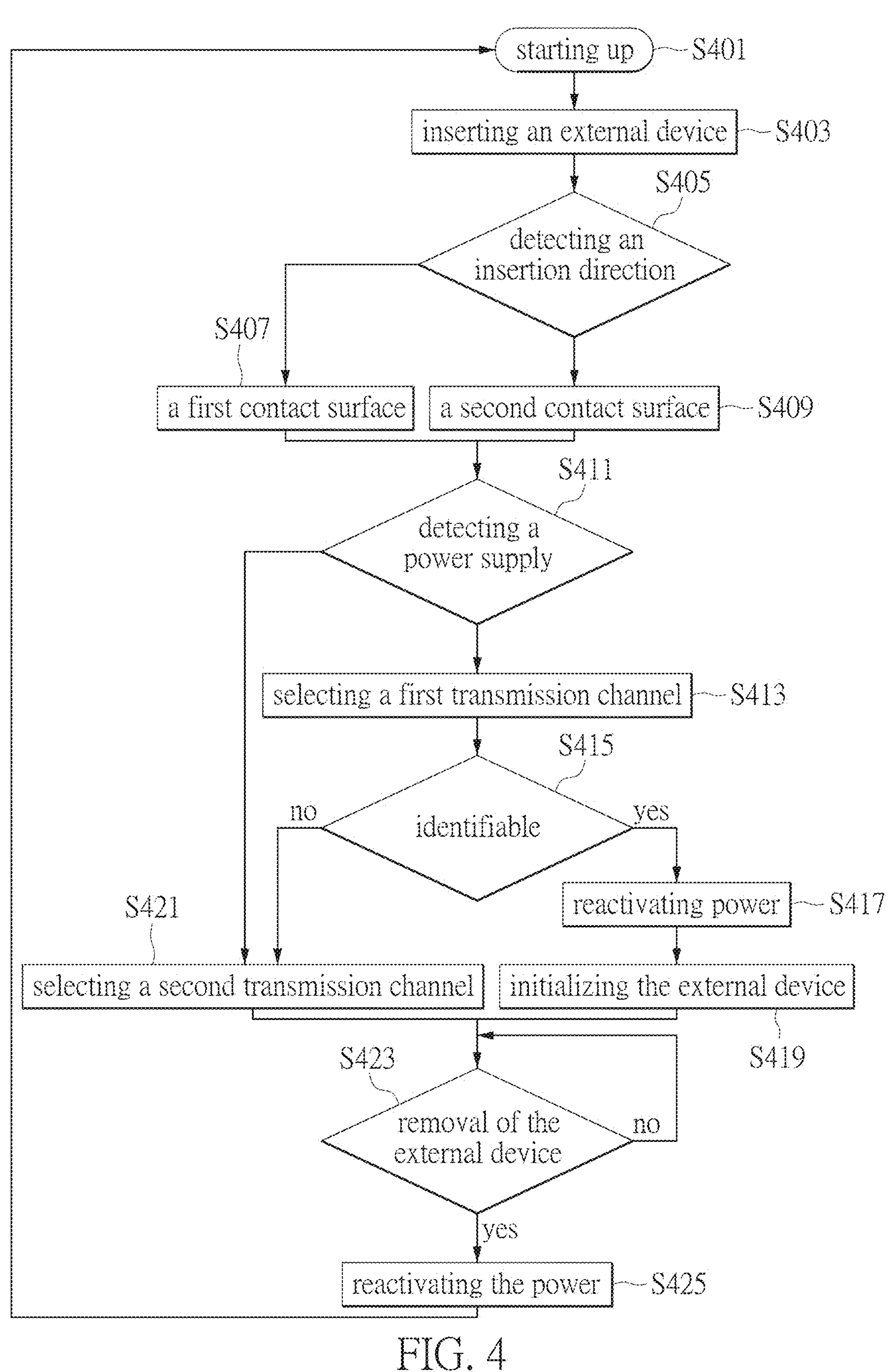
FIG. 4 is a flowchart of a transmission control method of the portable electronic device according to one embodiment of the present disclosure.

Referring to FIG. 4, which is a flowchart of a transmission control method of the portable electronic device according to one embodiment of the present disclosure. A flowchart shown in FIG. 4 includes, for example but not limited to, the following steps. Reference can also be made to the framework of the portable electronic device mentioned in the previous embodiment.

Step S401: starting up. Execution starts when power of the portable electronic device 1 is activated.

Step S403: inserting the external device 3. When the transmission interface 16 of the portable electronic device 1 is inserted with the external device 3, the type of the external device 3 is detected to determine a transmission channel to be used. The transmission channel can be, for example, the first transmission channel C1 and the second transmission channel C2.

Step S405: detecting an insertion direction. The portable electronic device 1 can detect the transmission interface 16 by the power management circuit 14, so as to identify the insertion direction between the connector of the external device 3 and the transmission interface 16.

Step S407: the first contact surface. When a detection result of step S405 shows that the insertion direction is defined by the transmission interface 16 using the first contact surface of the connector, the power management circuit 14 outputs the second switching signal S2 to the third switch 123, such that the fifth transmission path 25 is connected to the first contact surface.

Step S409: the second contact surface. When the detection result of step S405 shows that the insertion direction is defined by the transmission interface 16 using the second contact surface of the connector, the power management circuit 14 outputs the second switching signal S2 to the third switch 123, such that the sixth transmission path 26 is connected to the second contact surface.

Step S411: detecting a power supply. The portable electronic device 1 uses the power management circuit 14 to communicate with the external device 3 via the transmission interface 16, and the type of the external device 3 (e.g., whether the external device 3 is a power receiving device or a power supply device) can be identified according to a communication result. In one embodiment, the power management circuit 14 and the external device 3 can use configuration channel (CC) pins for mutual communication, so as to identify whether each party is a power supply type or a power receiving type.

Step S413: selecting the first transmission channel C1. When a detection result of step S411 shows that the external device 3 is the power receiving device, the portable electronic device 1 selects the first transmission channel C1 for data transmission with the external device 3, and the power management circuit 14 can simultaneously supply the power to the external device 3. For example, the control circuit 10 can output the first switching signal S1 to the first switch 121 and the second switch 122, such that the first switch 121 selects the first transmission path 21 for conduction with the control circuit 10, and the second switch 122 selects the third transmission path 23 for conduction with the control circuit 10. Then, the third switch 123 is configured to enable conduction between the first transmission channel C1 (which includes the first transmission path 21 and the third transmission path 23) and the transmission interface 16.

Step S415: identifiable. The portable electronic device 1 outputs the device identification signal to the external device 3 via the first transmission channel C1, so as to further confirm whether or not the type of the external device 3 can be successfully identified by the portable electronic device 1. For example, the control circuit 10 outputs the device identification signal to the external device 3 once or multiple times via the first transmission path 21, and determines whether or not the first transmission path 21 can successfully obtain a response signal of the external device 3 within a predetermined period of time.

Step S417: reactivating the power. When the response signal of the external device 3 is obtainable in step S415, the external device 3 is indicated to be identifiable by the portable electronic device 1. As such, the portable electronic device 1 can control the power management circuit 14 to reactivate the power for the external device 3. For example, the control circuit 10 firstly controls the power management circuit 14 to stop transmitting the power to the transmission interface 16, and then controls the power management circuit 14 to re-transmit the power to the transmission interface 16.

Step S419: initializing the external device 3. The portable electronic device 1 initializes the external device 3, such that the external device 3 can be smoothly activated for operation. In addition, relevant signal transmission can be carried out between the portable electronic device 1 and the external device 3. For example, the control circuit 10 outputs an initialization signal to the external device 3 via the first transmission path 21, and the control circuit 10 obtains the external signal provided by the external device 3 via the third transmission path 23.

Step S421: selecting the second transmission channel C2. When the detection result of step S411 shows that the external device 3 is the power supply device, the portable electronic device 1 selects the second transmission channel C2 for data transmission with the external device 3, and the power management circuit 14 can simultaneously receive the power supply of the external device 3. When the response signal of the external device 3 is not obtainable in step S415, the external device 3 is not indicated to be identifiable by the portable electronic device 1, and the portable electronic device 1 selects the second transmission channel C2 for data transmission with the external device 3.

Step S423: removal of the external device 3. The portable electronic device 1 determines whether or not the external device 3 is removed. For example, the power management circuit 14 can detect whether or not the external device 3 is removed through a connection status of the transmission interface 16.

Step S425: reactivating the power. When it is determined to be "yes" in step S423 (i.e., the external device 3 has been removed), the transmission interface 16 is confirmed to be no longer connected to the external device 3. As such, the control circuit 10 controls the power management circuit 14 to stop transmitting the power to the transmission interface 16, and then controls the power management circuit 14 to re-transmit the power to the transmission interface 16. Afterwards, the transmission control method returns to step S401 for further execution.

It should be noted that data transmission between the control circuit 10 and the external device 3 in step S419 is carried out in accordance with the first transmission protocol, and data transmission between the control circuit 10 and the external device 3 in step S421 is carried out in accordance with the second transmission protocol. For example, the first transmission protocol can be compatible with an MIPI transmission protocol, and the second transmission protocol can be compatible with a USB transmission protocol. Hence, when the external device 3 that is inserted with the transmission interface 16 is an MIPI imaging device, transmission of the image signal between the control circuit 10 and the MIPI imaging device is carried out via the first transmission channel C1 and in accordance with the first transmission protocol. In addition, when the external device 3 that is inserted with the transmission interface 16 is a USB device, data transmission between the control circuit 10 and the USB device is carried out via the second transmission channel C2 and in accordance with the USB transmission protocol.

Another Embodiment of the Portable Electronic Device

Figure 5:
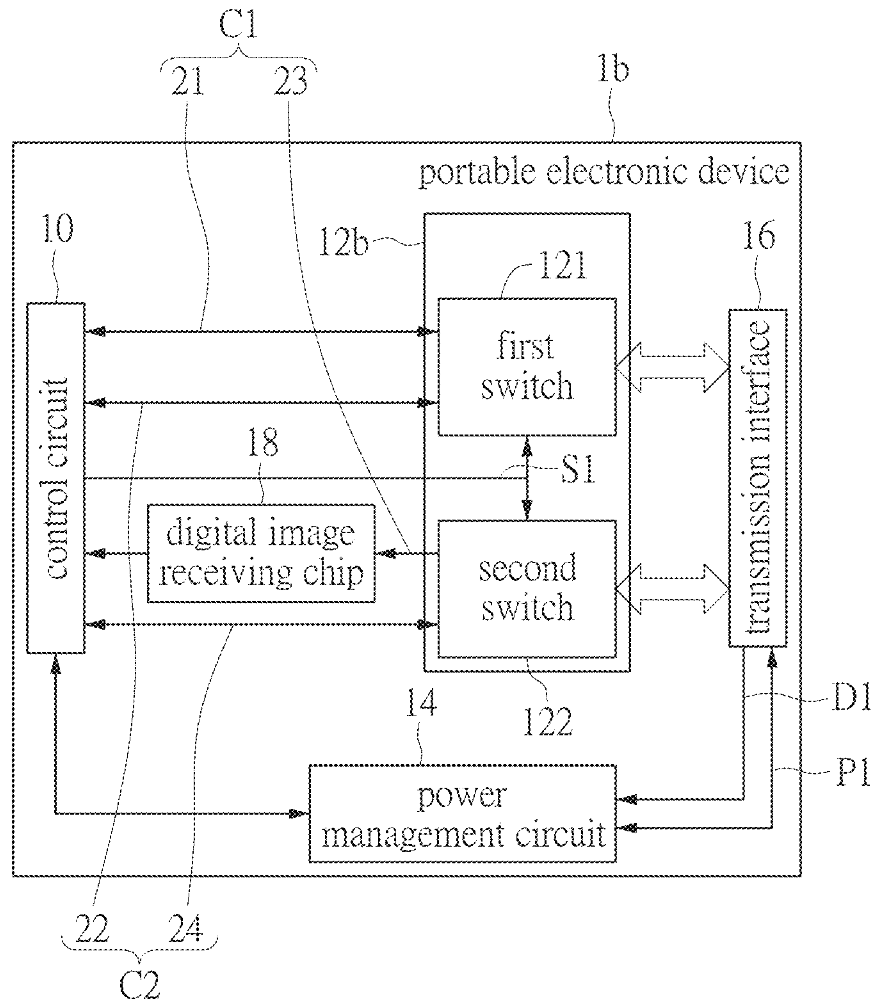
FIG. 5 is a circuit block diagram of the portable electronic device according to one embodiment of the present disclosure.

Reference is made to FIG. 5, which is a circuit block diagram of the portable electronic device according to one embodiment of the present disclosure. As shown in a portable electronic device 1*b* of FIG. 5, possible operations of a switching circuit 12*b* will be described based on the framework of FIG. 1. The switching circuit 12*b* includes, for example but not limited to, the first switch 121 and the second switch 122. The first switch 121 provides the first transmission path 21 and the second transmission path 22 for connection to the control circuit 10. The second switch 122 provides the third transmission path 23 and the fourth transmission path 24 for connection to the control circuit 10. The control circuit 10 outputs the first switching signal S1 to the first switch 121 and the second switch 122, such that the first switch 121 and the second switch 122 use the first switching signal S1 to select the first transmission channel C1 or the second transmission channel C2 for conduction with the transmission interface 16.

In one embodiment, the power management circuit 14 detects whether or not the transmission interface 16 is inserted with the external device 3 according to changes in pin level, and the control circuit 10 outputs the first switching signal S1 according to the detection result of the power management circuit 14. For example, the power management circuit 14 can obtain a voltage level change in a detection pin D1 of the transmission interface 16. When the detection pin D1 is at a first level, the external device 3 is indicated to be inserted with the transmission interface 16. When the detection pin D1 is at a second level, the external device 3 is indicated to be not inserted with the transmission interface 16.

When the control circuit 10 is notified by the power management circuit 14 of the insertion of the external device 3 with the transmission interface 16, the control circuit 10 outputs the first switching signal S1 to select the first transmission channel C1 or the second transmission channel C2 for data transmission with the external device 3. Moreover, when the first transmission channel C1 is being selected, the control circuit 10 can further confirm whether or not the external device 3 is identifiable by outputting a signal. While the selection of the first transmission channel C1 for data transmission will be maintained if the control circuit 10 can perform identification, the second transmission channel C2 will be selected for data transmission if the control circuit 10 fails to perform identification.

Figure 6:
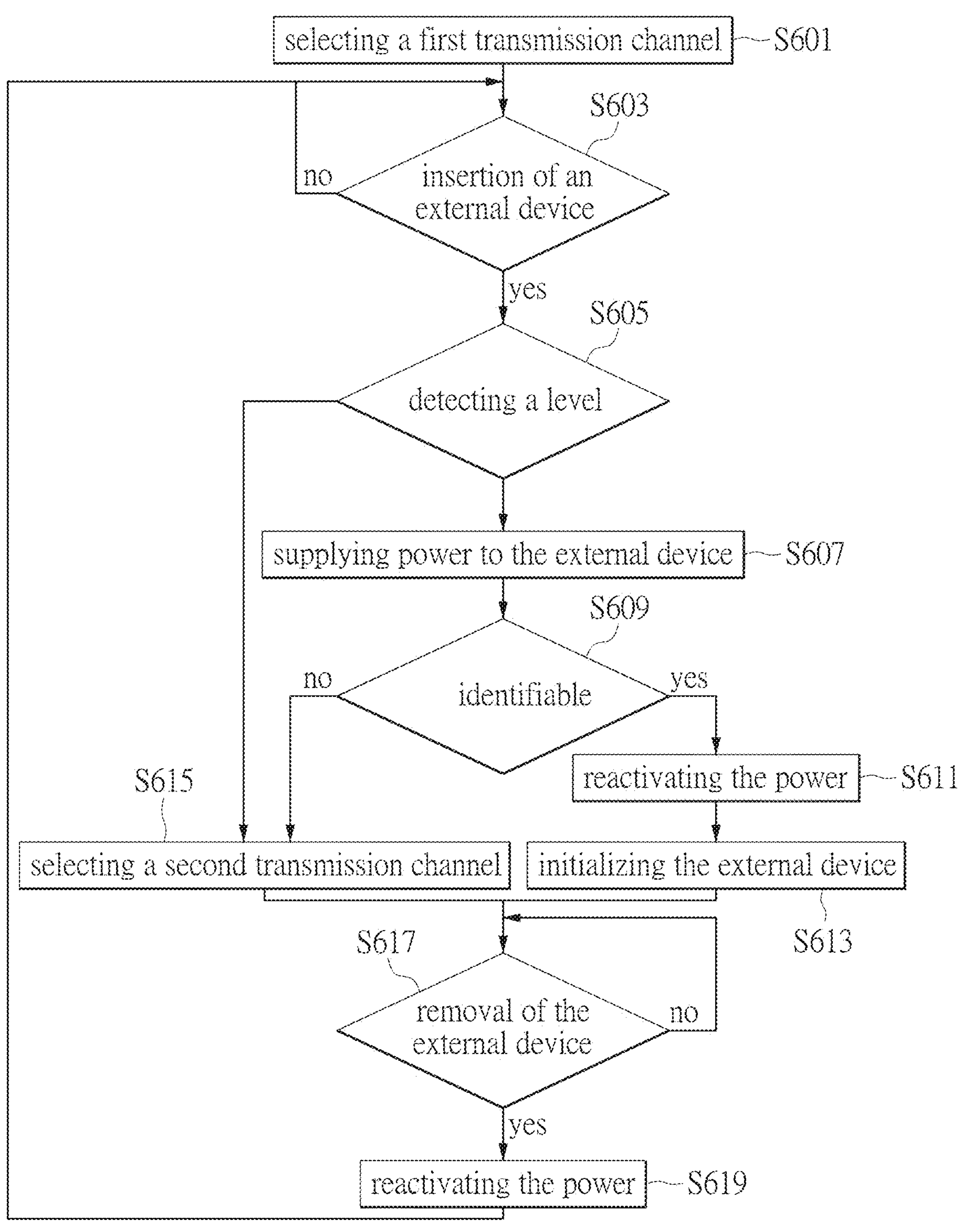
FIG. 6 is a flowchart of the transmission control method of the portable electronic device according to one embodiment of the present disclosure.

Another Embodiment of Transmission Control Method of the Portable Electronic Device Reference is made to FIG. 6, which is a flowchart of the transmission control method of the portable electronic device according to one embodiment of the present disclosure. A flowchart shown in FIG. 6 includes, for example but not limited to, the following steps. Reference can also be made to the framework of the portable electronic device mentioned in the previous embodiment.

Step S601: selecting the first transmission channel C1. When the portable electronic device 1*b* is turned on for use, the control circuit 10 pre-selects the first transmission channel C1 for data transmission with the external device 3.

Step S603: determining whether or not there is insertion of the external device 3. By obtaining a change in the detection pin D1 of the transmission interface 16, the power management circuit 14 can determine whether or not the transmission interface 16 is inserted with the external device 3.

S605: detecting a level. When a determination result of step S603 shows that the external device 3 is inserted with the transmission interface 16, the power management circuit 14 further detects a voltage level of the detection pin D1, so as to determine whether the current voltage level of the detection pin D1 is a first level or a second level.

Step S607: supplying power to the external device 3. When the voltage level of the detection pin D1 is the first level, the power management circuit 14 supplies the power to the external device 3. At this time, the external device 3 is a power receiving device.

Step S609: identifiable. For execution of step S609, reference can be made to step S415.

Step S611: reactivating the power. For execution of step S611, reference can be made to step S417.

Step S613: initializing the external device 3. For execution of step S613, reference can be made to step S419.

Step S615: selecting the second transmission channel C2. When the voltage level of the detection pin D1 is the second level, the power management circuit 14 receives a power supply of the external device 3. That is, at this time, the external device 3 is a power supply device, and the control circuit 10 selects the second transmission channel C2 for data transmission with the external device 3. When the response signal of the external device 3 is not obtainable in step S609, the external device 3 is not indicated to be identifiable by the portable electronic device 1, and the portable electronic device 1 selects the second transmission channel C2 for data transmission with the external device 3.

Step S617: removal of the external device 3. For execution of step S617, reference can be made to step S423.

Step S619: reactivating the power. For execution of step S619, reference can be made to step S425.

Figure 7:
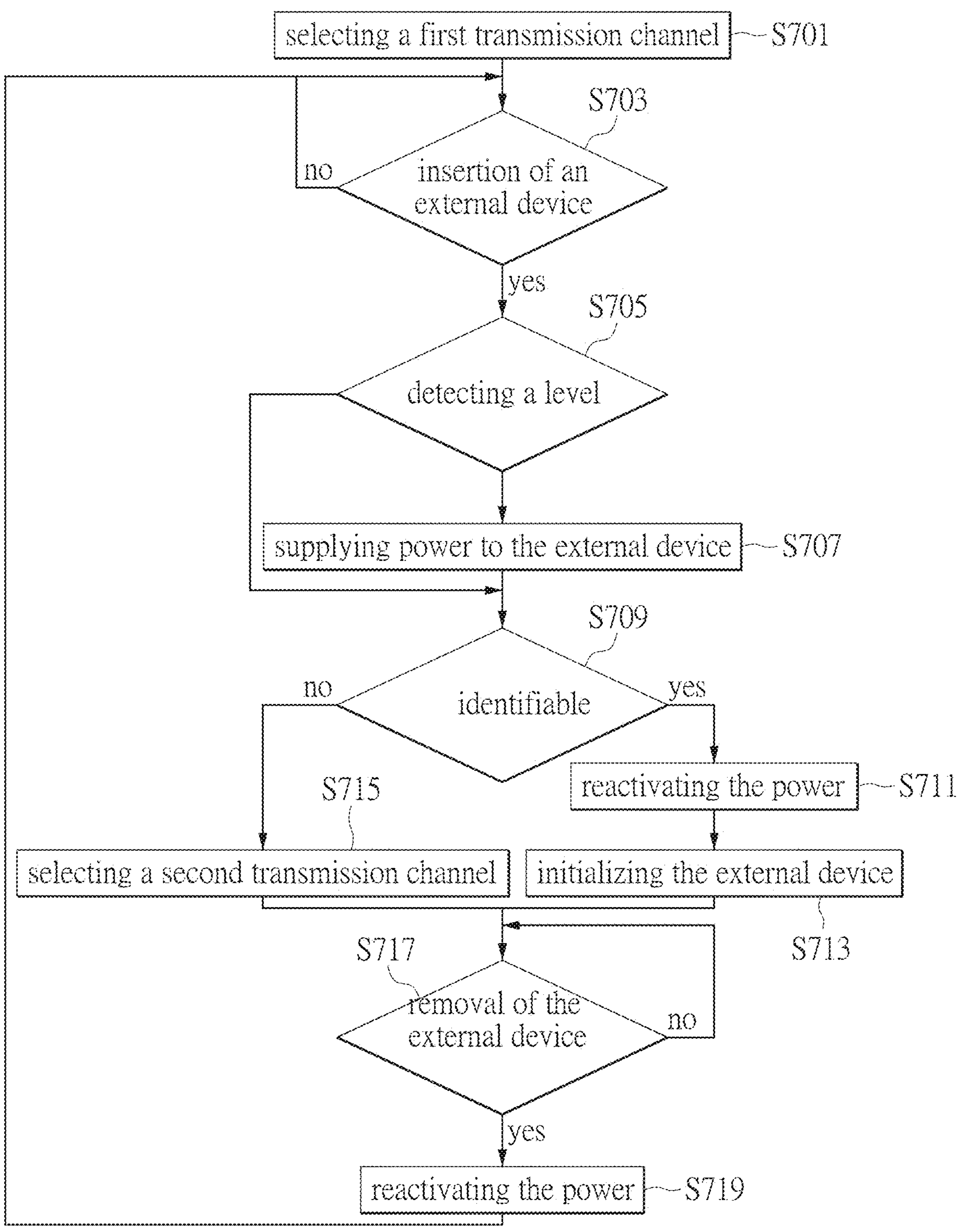
FIG. 7 is a flowchart of the transmission control method of the portable electronic device according to one embodiment of the present disclosure.

Reference is made to FIG. 7, which is a flowchart of the transmission control method of the portable electronic device according to one embodiment of the present disclosure. A flowchart shown in FIG. 7 includes, for example but not limited to, the following steps. Reference can also be made to the framework of the portable electronic device mentioned in the previous embodiment.

Step S701: selecting the first transmission channel C1. When the portable electronic device 1*b* is turned on for use, the control circuit 10 pre-selects the first transmission channel C1 for data transmission with the external device 3.

Step S703: determining whether or not there is insertion of the external device 3. By obtaining a change in the detection pin D1 of the transmission interface 16, the power management circuit 14 can determine whether or not the transmission interface 16 is inserted with the external device 3.

Step S705: detecting a level. When a determination result of step S703 shows that the external device 3 is inserted with the transmission interface 16, the power management circuit 14 further detects a voltage level of the detection pin D1, so as to determine whether the current voltage level of the detection pin D1 is a first level or a second level. When the voltage level of the detection pin D1 is the first level, step S707 is performed. When the voltage level of the detection pin D1 is the second level, step S709 is performed, and the power management circuit 14 receives a power supply of the external device 3. That is, at this time, the external device 3 is a power supply device.

Step S707: supplying power to the external device 3. The power management circuit 14 supplies the power to the external device 3. At this time, the external device 3 is a power receiving device.

Step S709: identifiable. For execution of step S709, reference can be made to step S415.

Step S711: reactivating the power. For execution of step S711, reference can be made to step S417.

Step S713: initializing the external device 3. For execution of step S713, reference can be made to step S419.

Step S715: selecting the second transmission channel C2. When the control circuit 10 fails to identify the external device 3, the control circuit 10 selects the second transmission channel C2 for data transmission with the external device 3.

Step S717: removal of the external device 3. For execution of step S717, reference can be made to step S423.

Step S719: reactivating the power. For execution of step S719, reference can be made to step S425.

Figure 8:
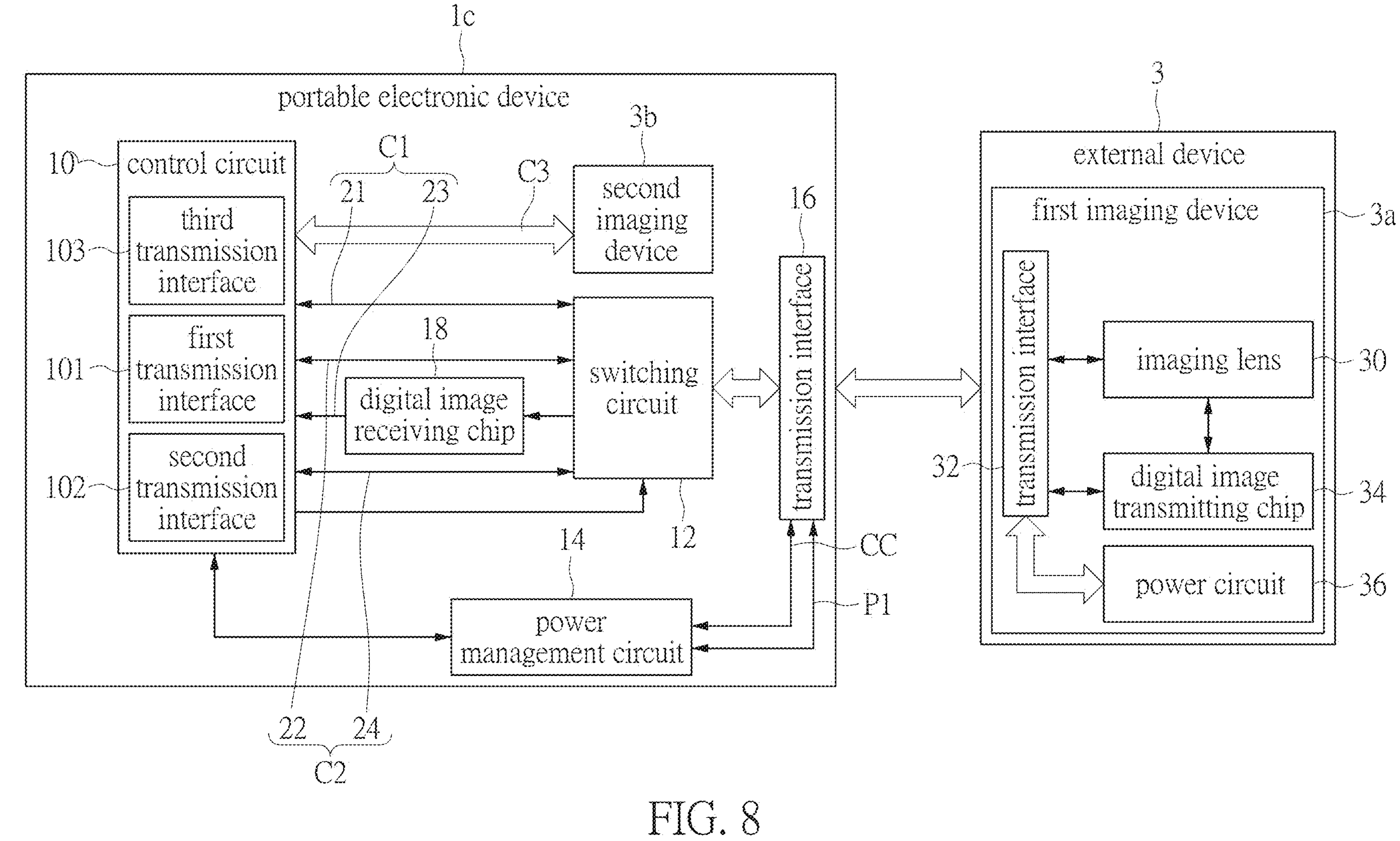
FIG. 8 is a schematic diagram of the framework of the portable electronic device and the external device according to one embodiment of the present disclosure.

Embodiment of the Portable Electronic Device Supporting Use of Multiple Imaging Devices Reference is made to FIG. 8, which is a schematic diagram of the framework of the portable electronic device and the external device according to one embodiment of the present disclosure. Compared with the portable electronic device 1 of FIG. 1, a portable electronic device 1*c* shown in FIG. 8 further includes a second imaging device 3*b*. Reference can be made to the previous embodiments for components that are marked with the same reference numerals, and only differences thereof will be illustrated herein.

In one embodiment, the control circuit 10 has the first transmission interface 101, the second transmission interface 102, and a third transmission interface 103. Through the first transmission interface 101, the control circuit 10 performs data transmission in the first transmission channel C1 according to the first transmission protocol. Through the second transmission interface 102, the control circuit 10 performs data transmission in the second transmission channel C2 according to the second transmission protocol. Through the third transmission interface 103, the control circuit 10 performs data transmission in the third transmission channel C3 according to a third transmission protocol. The third transmission channel C3 is connected to the control circuit 10 and the second imaging device 3*b*.

The external device 3 is exemplified as a first imaging device 3*a*. The first imaging device 3*a* includes, for example but not limited to, an imaging lens 30, a transmission interface 32, a digital image transmitting chip 34, and a power circuit 36. The transmission interface 32 is connected to the imaging lens 30, the digital image transmitting chip 34, and the power circuit 36, and the imaging lens 30 is connected to the digital image transmitting chip 34. Here, the imaging lens 30 is an MIPI imaging lens, the digital image transmitting chip 34 is a serializer, and the digital image receiving chip 18 is a deserializer.

When the power management circuit 14 determines that the first imaging device 3*a* is inserted with the transmission interface 16 through detection of the communication pin CC, and the control circuit 10 successfully identifies the first imaging device 3*a* via the first transmission channel C1, the control circuit 10 can receive an image signal of the first imaging device 3*a* via the first transmission channel C1.

In one embodiment, the control circuit 10 can store the image signal of the first imaging device 3*a* in a built-in memory or an external memory card of the portable electronic device 1*c*, or can display the image signal of the first imaging device 3*a* on a display device of the portable electronic device 1*c*.

In one embodiment, according to an operation, the control circuit 10 selectively obtains an image signal of the second imaging device 3*b* or the image signal of the first imaging device 3*a* via the transmission interface 16. For example, when a control interface of the portable electronic device 1*c* obtains an operation from an operator to display the first imaging device 3*a*, the control circuit 10 can control the image signal of the first imaging device 3*a* to be displayed on the display device. When the control interface of the portable electronic device 1*c* obtains an operation from the operator to display the second imaging device 3*b*, the control circuit 10 can control the image signal of the second imaging device 3*b* to be displayed on the display device. When the control interface of the portable electronic device 1*c* obtains an operation from the operator to display multiple imaging devices, the control circuit 10 can simultaneously control the image signals of the first imaging device 3*a* and the second imaging device 3*b* to be separately displayed on the display device.

Figure 9:
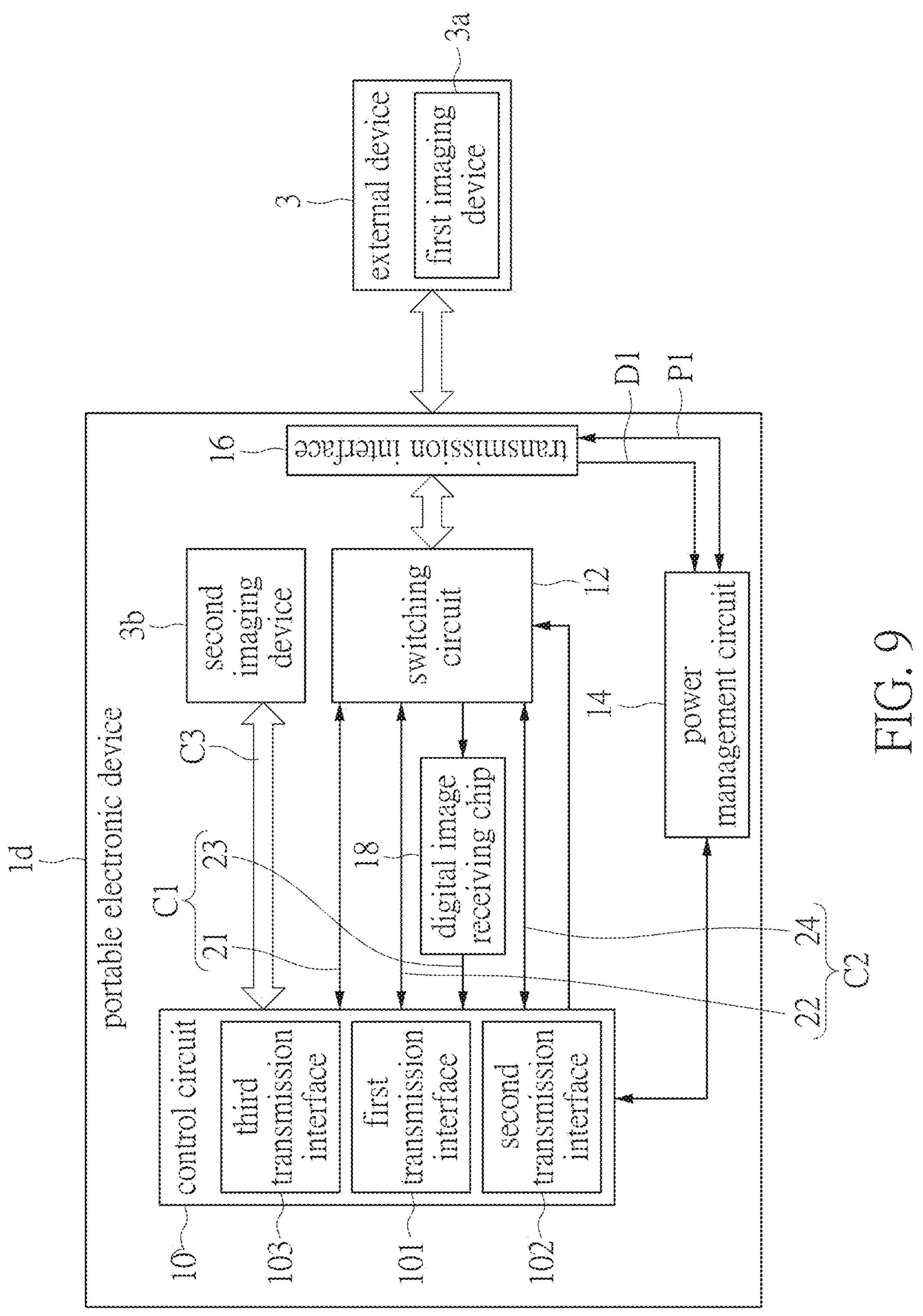
FIG. 9 is a schematic diagram of the framework of the portable electronic device and the external device according to one embodiment of the present disclosure.

Reference is made to FIG. 9, which is a schematic diagram of the framework of the portable electronic device and the external device according to one embodiment of the present disclosure. The difference between a portable electronic device 1*d* shown in FIG. 9 and the portable electronic device 1*c* of FIG. 8 resides in different detection methods of the power management circuit 14. The power management circuit 14 shown in FIG. 9 detects whether or not the first imaging device 3*a* is inserted with the transmission interface 16 by detecting a voltage level change in the detection pin D1. Reference can be made to the previous embodiments for components that are marked with the same reference numerals, and details thereof will not be reiterated herein.

In one embodiment, the control circuit 10 can be, for example, one or any combination of an application-specific integrated circuit (ASIC), a field-programmable gate array (FPGA), and a system on a chip (SoC). The control circuit 10 can cooperate with other related circuit components and firmware to realize the above-mentioned functional processes.

Based on the descriptions of the above-mentioned embodiments, when the external device is an imaging device that performs data transmission according to the first transmission protocol, said imaging device can be used by being inserted with the transmission interface of the portable electronic device via a transmission line. In this way, a capturing angle of said imaging device can be more flexible and much less limited. Furthermore, when the external device is other devices that perform data transmission according to the second transmission protocol, the portable electronic device can similarly perform data transmission with these devices via the same transmission interface.

In conclusion, in the portable electronic device and the transmission control method thereof provided by the present disclosure, the portable electronic device allows insertion of multiple external devices having different functions through one single transmission interface. In addition, the portable electronic device can confirm the type of the external device through multiple verification processes. That is, a transmission channel that is compatible with the external device for data transmission can be selectively used. Accordingly, with one single transmission interface, the portable electronic device can support multiple external devices having different transmission protocols.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A portable electronic device, comprising:

a transmission interface configured to connect to an external device;

a power management circuit detecting the external device as a power supply device or a power receiving device;

a switching circuit providing a first transmission channel or a second transmission channel for connection to the transmission interface; and a control circuit controlling the switching circuit according to a detection result of the power management circuit;

wherein, when the control circuit controls the switching circuit to select the first transmission channel for conduction with the transmission interface, the control circuit outputs a device identification signal via the first transmission channel, so as to identify the external device that is connected to the transmission interface;

wherein, when the external device is identifiable by the device identification signal, the control circuit receives an image signal of the external device via the first transmission channel;

wherein, when the external device is not identifiable by the device identification signal, the control circuit controls the switching circuit to select the second transmission channel for conduction with the transmission interface, and the control circuit performs signal transmission with the external device via the second transmission channel.

2. The portable electronic device according to claim 1, wherein, when the power management circuit detects the external device as the power receiving device, the power management circuit supplies power to the power receiving device, and the control circuit controls the switching circuit to select the first transmission channel for conduction with the transmission interface; wherein, when the power management circuit detects the external device as the power supply device, the power management circuit receives power supplied by the power supply device, and the control circuit controls the switching circuit to select the second transmission channel for conduction with the transmission interface.

3. The portable electronic device according to claim 1, wherein, when the power management circuit detects the external device as the power receiving device, the power management circuit supplies power to the power receiving device, and the control circuit controls the switching circuit to select the first transmission channel for conduction with the transmission interface; wherein, when the power management circuit detects the external device as the power supply device, the power management circuit receives power supplied by the power supply device, and the control circuit controls the switching circuit to select the first transmission channel for conduction with the transmission interface.

4. The portable electronic device according to claim 1, wherein the switching circuit comprises:

a first switch providing a first transmission path and a second transmission path for connection to the control circuit; and a second switch providing a third transmission path and a fourth transmission path for connection to the control circuit;

wherein the first transmission channel comprises the first transmission path and the third transmission path, and the second transmission channel comprises the second transmission path and the fourth transmission path;

wherein the control circuit outputs a first switching signal to the first switch and the second switch, such that the first switch and the second switch use the first switching signal to select the first transmission channel or the second transmission channel for conduction with the transmission interface;

wherein the first transmission path is configured to transmit the device identification signal, the second transmission path is configured to transmit a first signal, the third transmission path is configured to transmit the image signal of the external device, and the fourth transmission path is configured to transmit a second signal.

5. The portable electronic device according to claim 4, wherein the switching circuit further comprises:

a third switch providing a fifth transmission path and a sixth transmission path for connection to the transmission interface;

wherein a power controller of the power management circuit detects a connection direction between a connector of the external device and the transmission interface, and the power controller of the power management circuit outputs a second switching signal to the third switch according to the detection result, such that the third switch uses the second switching signal to select the fifth transmission path or the sixth transmission path for conduction with the first transmission channel or the second transmission channel.

6. The portable electronic device according to claim 5, wherein the third switch is connected to the first switch and the second switch, the first transmission path or the second transmission path is connected to the transmission interface via the first switch and the third switch, and the third transmission path or the fourth transmission path is connected to the transmission interface via the second switch and the third switch.

7. The portable electronic device according to claim 5, wherein the third switch is connected to the second switch, the first transmission path or the second transmission path is connected to the transmission interface via the first switch, and the third transmission path or the fourth transmission path is connected to the transmission interface via the second switch and the third switch.

8. The portable electronic device according to claim 4, further comprising:

a digital image receiving chip disposed between the third transmission path and the control circuit, wherein the digital image receiving chip receives and converts the image signal of the external device.

9. The portable electronic device according to claim 8, wherein the digital image receiving chip is a deserializer, and the digital image receiving chip converts the image signal that is output by the external device via a serializer into an image signal that meets mobile industry processor interface (MIPI) specifications.

10. The portable electronic device according to claim 1, wherein the transmission interface is a connector that meets universal serial bus (USB) Type-C specifications, and the external device is an imaging device, a USB device, a USB host, or a power bank.

11. The portable electronic device according to claim 1, wherein, when the control circuit determines through the device identification signal that the external device is a first imaging device, the control circuit controls the power management circuit to stop supplying power to the first imaging device, and then controls the power management circuit to re-supply the power to the first imaging device.

12. The portable electronic device according to claim 1, wherein, when the control circuit determines that the external device is removed from the transmission interface, the control circuit controls the power management circuit to stop transmitting power to the transmission interface, and then controls the power management circuit to re-transmit the power to the transmission interface.

13. The portable electronic device according to claim 11, further comprising:

a second imaging device connected to the control circuit; wherein, according to an operation, the control circuit selectively obtains an image signal of the second imaging device or the image signal of the first imaging device that is connected to the transmission interface.

14. A transmission control method of a portable electronic device, comprising:

detecting whether an external device is a power supply device or a power receiving device when the external device is connected to a transmission interface of the portable electronic device;

controlling, according to a detection result, a switching circuit of the portable electronic device to select a first transmission channel or a second transmission channel for conduction with the transmission interface;

outputting, when the switching circuit selects the first transmission channel for conduction with the transmission interface, a device identification signal via the first transmission channel for identification of the external device that is connected to the transmission interface, and receiving an image signal of the external device via the first transmission channel when the external device is identifiable by the device identification signal; and controlling the switching circuit to select the second transmission channel for conduction with the transmission interface when the external device is not identifiable by the device identification signal, and performing signal transmission with the external device via the second transmission channel.

15. The transmission control method according to claim 14, further comprising:

determining a position of a contact surface between the external device and the transmission interface; and controlling, according to a determination result of the position of the contact surface, the switching circuit to connect each of the first transmission channel and the second transmission channel to the position of the contact surface.

16. The transmission control method according to claim 14, further comprising:

controlling the switching circuit to select the second transmission channel for conduction with the transmission interface when the device identification signal is output to the external device multiple times via the first transmission channel and no response signal of the external device is obtainable.

17. The transmission control method according to claim 14, wherein, when the external device is the power receiving device, the portable electronic device supplies power to the power receiving device, and the switching circuit selects the first transmission channel for conduction with the transmission interface;

wherein, when the external device is the power supply device, the portable electronic device receives power supplied by the power supply device, and the switching circuit selects the second transmission channel for conduction with the transmission interface.

18. The transmission control method according to claim 14, wherein, when the external device is the power receiving device, the portable electronic device supplies power to the power receiving device, and the switching circuit selects the first transmission channel for conduction with the transmission interface;

wherein, when the external device is the power supply device, the portable electronic device receives power supplied by the power supply device, and the switching circuit selects the first transmission channel for conduction with the transmission interface.

19. The transmission control method according to claim 14, wherein, when the external device is determined to be a first imaging device through the device identification signal, and the first imaging device is the power receiving device, the portable electronic device stops supplying power to the first imaging device, and then re-supplies the power to the first imaging device;

wherein, when the external device is determined to be the first imaging device through the device identification signal, and the first imaging device is the power supply device, the portable electronic device controls the first imaging device to reset;

wherein, according to an operation, an image signal of a second imaging device that is disposed inside the portable electronic device or the image signal of the first imaging device that is connected to the transmission interface is selectively obtained.

20. The transmission control method according to claim 14, further comprising:

configuring the portable electronic device to stop supplying power to the transmission interface and then re-supply the power to the transmission interface when the external device is determined to be removed from the transmission interface.

* * * * *